United States Patent [19]

Yamada et al.

[11] Patent Number: 4,923,944

[45] Date of Patent: May 8, 1990

[54] RELEASE AGENT COMPOSITION

[75] Inventors: Takateru Yamada; Shosaku Sasaki, both of Chiba, Japan

[73] Assignee: Toray Silicone Company, Ltd., Tokyo, Japan

[21] Appl. No.: 275,455

[22] Filed: Nov. 22, 1988

[30] Foreign Application Priority Data

Nov. 27, 1987 [JP] Japan ................. 62-298766
Feb. 23, 1988 [JP] Japan ................. 63-40138

[51] Int. Cl.$^5$ ............................. C08G 77/06
[52] U.S. Cl. ........................... 528/15; 528/31; 528/32; 525/478; 524/300; 524/361; 524/464; 524/474; 524/588; 524/792; 524/861
[58] Field of Search ................ 528/15, 31, 32; 525/478; 524/300, 361, 464, 474, 588, 792, 861

[56] References Cited

U.S. PATENT DOCUMENTS 4,677,161 6/1987 Suzuchi et al. ............ 524/731
4,742,101 5/1988 Yoshida et al. ............ 528/15
4,824,616 4/1989 Shimizu et al. ............ 528/15

FOREIGN PATENT DOCUMENTS 46-26798 8/1971 Japan .
47-32072 8/1972 Japan .
53-39791 10/1978 Japan .

Primary Examiner—Melvyn I. Marquis
Attorney, Agent, or Firm—George A. Grindahl

[57] ABSTRACT

A release agent composition which manifests almost no silicone migration and a very low slickness while nevertheless having a low release value is achieved by means of a release agent composition which is based on a methylalkenylpolysiloxane, an alkylhydrogenpolysiloxane crosslinker for the methylalkenylpolysiloxane, an organopolysiloxane containing monovalent hydrocarbon groups which lacks aliphatically unsaturated bonds and which contains 6 to 18 carbon atoms which functions to lighten the releaseability of the cured film, to check silicone migration, and to reduce the slickness, and a catalytic quantity of a platinum-type catalyst.

6 Claims, No Drawings

RELEASE AGENT COMPOSITION

BACKGROUND OF THE INVENTION

The present invention relates to a release agent composition. It is well known that releaseability from tacky substances can be obtained by the formation of a cured organopolysiloxane film on the surface of diverse substrates, for example, various types of paper, laminated papers, synthetic films, textiles, metal foils, etc. Thus, for example, Japanese Patent Publication Number 46-26798 (26,798/71) teaches a solvent-type release agent composition which employs an organic solvent during coating, while Japanese Patent Application Laid Open (Kokai or Unexamined) Number 47-32072 (32,072/72) and Japanese Patent Publication Number 53-39791 (39,791/78) teach solventless release agent compositions which do not use organic solvent in the coating operation. Among the release agent compositions known in the art, low release-value grades (typically with a release force no larger than 20 g/5 cm) are used on the light surfaces of, for example, labels and double-faced tapes. However, problems arise in this area due to silicone migration and the substantial slickness of the cured film. Thus, with regard to problems related to silicone migration, when the release paper is wound up after curing, the silicone surface comes into contact with the roll, and silicone accumulates on the roll and ultimately soils and contaminates the roll. Furthermore, the silicone migrates from the silicone surface of the rolled-up release paper to the back side of the substrate and can thus degrade the print legibility on the adhered paper. In the case of a double-faced separator, the silicone migrates from the low-release value surface to the high-release value surface, which as a consequence causes a change in the release properties of the high-release value surface. Considering problems related to the slickness, the shape is prone to collapse during release paper roll-up, and, furthermore, the shape is also prone to collapse during storage of the release paper roll.

BRIEF SUMMARY OF THE INVENTION

The object of the present invention is to solve the aforementioned problems by introducing a release agent composition which manifests almost no silicone migration and a very low slickness while nevertheless having a low release value. The aforesaid object is achieved by means of a release agent composition which is characteristically based on (A) 100 weight parts methylalkenylpolysiloxane having at least 2 alkenyl groups in each molecule and having a viscosity of at least 40 centipoise at 25 degrees Centigrade, (B) 0.5 to 20 weight parts alkylhydrogenpolysiloxane having at least 3 silicon-bonded hydrogen atoms in each molecule and having a viscosity of 1 to 1,000 centipoise at 25 degrees Centigrade, (C) 0.1 to 6.0 weight parts organopolysiloxane having the formula $R^1(R_2SiO)_nSiR_2R^1$ and a viscosity of 100 to 500,000 centipoise at 25 degrees Centigrade wherein R is the methyl group or a monovalent hydrocarbon group which lacks aliphatically unsaturated bonds and which contains 6 to 18 carbon atoms, with the proviso that said monovalent hydrocarbon group which lacks aliphatically unsaturated bonds and which contains 6 to 18 carbon atoms comprises 2 to 20 mole % of the total groups R in the molecule; $R^1$ is selected from the group consisting of a monovalent hydrocarbon group which lacks aliphatically unsaturated bonds and which contains 1 to 18 carbon atoms, the hydroxyl group and an alkoxy group; and n is a positive integer with a value which provides a viscosity of 100 to 500,000 centipoise at 25 degrees Centigrade, and (D) a catalytic quantity of a platinum-type catalyst.

DETAILED DESCRIPTION OF THE INVENTION

To explain the preceding in greater detail, the component (A) used in the present invention comprises methylalkenylpolysiloxane which has at least 2 alkenyl groups in the molecule and which has a viscosity of at least 40 centipoise at 25 degrees Centigrade. The function of this component is to form the release film through a crosslinking reaction with component (B). This crosslinking reaction with component (B) requires that each molecule of the instant component contain at least 2 alkenyl groups.

This component is typified by methylalkenylpolysiloxanes with the average formula $R^2_aSiO_{(4-a)/2}$ which have at least two alkenyl groups in each molecule and which have a viscosity of at least 40 centipoise at 25 degrees Centigrade. In the formula, $R^2$ is the methyl group or alkenyl group, and $a = 1.95$ to $2.05$. The alkenyl groups are exemplified by the vinyl, allyl, and propenyl groups, and the vinyl group is typical. While the molecular configuration of this methylalkenylpolysiloxane may be, for example, linear or branched, linear is preferred.

Examples for the molecular chain terminals are the trimethylsiloxy group, dimethylvinylsiloxy group, and hydroxyl group. The viscosity must be at least 40 centipoise, and compounds up to the level of gums can be used. Penetration into the substrate becomes too large when the viscosity falls below 40 centipoise. When the composition of the present invention is used as a solventless release agent composition, the viscosity of this component is preferably 40 to 10,000 centipoise and more preferably 100 to 5,000 centipoise. When a solvent is used, the viscosity preferably ranges from 100,000 centipoise to that of a gum and more preferably ranges from 500,000 centipoise to that of a gum.

This component is concretely exemplified as follows: dimethylvinylsiloxy-terminated dimethylpolysiloxanes, trimethylsiloxy-terminated methylvinylsiloxane-dimethylsiloxane copolymers, and hydroxyl-terminated methylvinylsiloxane-dimethylsiloxane copolymers.

The component (B) used in the present invention is an alkylhydrogenpolysiloxane which has at least 3 silicon-bonded hydrogen atoms in each molecule and which has a viscosity of 1 to 1,000 centipoise at 25 degrees Centigrade. This component functions as a crosslinker for component (A). Since the cured film is obtained by a crosslinking reaction with component (A), the instant component must contain at least 3 silicon-bonded hydrogen atoms in each molecule.

This component is typified by alkylhydrogenpolysiloxanes with the average formula $R^3_bSiO_{(4-b)/2}$ which have at least 3 silicon-bonded hydrogen atoms in each molecule and which have a viscosity of 1 to 1,000 centipoise at 25 degrees Centigrade. In the formula, $R^3$ is an alkyl group or the hydrogen atom, and $b = 1.50$ to $3.00$. The alkyl groups in the above formula are exemplified by methyl, ethyl, propyl, butyl, and octyl. Alkyl groups having 1 to 8 carbon atoms are preferred, and methyl is even more preferred. The molecular configuration of this component can be, for example, linear, branched, and cyclic. In the case of linear and branched forms, examples of the terminals are trialkylsiloxy groups and dialkylhydrogensiloxy groups. The viscosity at 25 degrees Centigrade is to be 1 to 1,000 centipoise: volatilization occurs too easily at lower viscosities, while at higher viscosities, the curing times must be lengthened in order to obtained cured films having suitable release performances. The viscosity is preferably 5 to 500 centipoise.

Concrete examples of this component are as follows: trimethylsiloxy-terminated dimethylsiloxanemethylhydrogensiloxane copolymers, dimethylhydrogensiloxy-terminated dimethylsiloxane-methylhydrogensiloxane copolymers, trimethylsiloxy-terminated methylhydrogenpolysiloxanes, methylhydrogenpolysiloxane cyclics, and methylhydrogensiloxane-dimethylsiloxane copolymer cyclics.

This component is added at 0.5 to 20 weight parts for each 100 weight parts of component (A). Curing will be unsatisfactory at below 0.5 weight parts, while exceeding 20 weight parts has an undesirable effect on the release performance of the cured film. This component is preferably added at 1 to 10 weight parts for each 100 weight parts of component (A).

Component (C) is the characterizing component of the present invention. It functions to lighten the releaseability of the cured film, to check silicone migration, and to reduce the slickness. This component is an organopolysiloxane having the general formula $R^1(R_2SiO)_nSiR_2R^1$ and a viscosity of 100 to 500,000 centipoise at 25 degrees Centigrade. In the formula, R is the methyl group or a monovalent hydrocarbon group which lacks aliphatically unsaturated bonds and which contains 6 to 18 carbon atoms, with the proviso that said monovalent hydrocarbon group which lacks aliphatically unsaturated bonds and which contains 6 to 18 carbon atoms comprises 2 to 20 mole % of the total groups R in the molecule; $R^1$ is a monovalent hydrocarbon group which lacks aliphatically unsaturated bonds and which contains 1 to 18 carbon atoms, or is the hydroxyl group or an alkoxy group; and n is a positive integer with a value which provides a viscosity of 100 to 500,000 centipoise at 25 degrees Centigrade.

Considering R in the preceding formula, the monovalent hydrocarbon group lacking aliphatically unsaturated bonds and having 6 to 18 carbon atoms is exemplified by aryl groups such as phenyl, tolyl, and xylyl; alkyl groups such as hexyl, octyl, decyl, tridecyl, and octadecyl, and aralkyl groups such as benzyl, phenethyl, 2-phenylpropyl, methylbenzyl, and naphthylmethyl. A single species or two or more species may be present within the single molecule.

With regard to $R^1$, the monovalent hydrocarbon group which lacks aliphatically unsaturated bonds and which contains 1 to 18 carbon atoms is concretely exemplified by the groups given for R above as well as by methyl, ethyl, propyl, butyl, and pentyl. Examples of alkoxy groups suitable as $R^1$ are the methoxy group, ethoxy group, and propoxy group. $R^1$ is preferably the hydroxyl group or a $C_1$ to $C_{18}$ alkyl group lacking aliphatically unsaturated bonds.

Monovalent hydrocarbon groups lacking aliphatically unsaturated bonds and containing 6 to 18 carbon atoms must comprise 2 to 20 mole % of the total groups R in each molecule of this organopolysiloxane. It is only within this specified range that the preceding functions are developed (lighten the releaseability of the cured film, check silicone migration, and low slickness). Furthermore, the individual silicon atoms may carry only one such group or may carry two such groups. When the monovalent hydrocarbon group which lacks aliphatically unsaturated bonds and which contains 6 to 18 carbon atoms is an aryl or aralkyl group, it is preferred that said monovalent hydrocarbon group comprise 2 to 12 mole % and more preferably 3 to 8 mole % of the total groups R in the individual molecule of this organopolysiloxane. The viscosity of this component should be 100 to 500,000 centipoise at 25 degrees Centigrade: release becomes heavy when this range is not obeyed. The viscosity of this component is preferably 100 to 50,000 centipoise and more preferably 200 to 10,000 centipoise when the composition of the present invention is used as a solvent-free release agent composition. In the case of solvent-type compositions, the viscosity is preferably 5,000 to 500,000 centipoise and more preferably 10,000 to 100,000 centipoise.

This component is to be added at 0.1 to 6.0 weight parts for each 100 weight parts of component (A): release becomes heavy at below 0.1 weight part, while silicone migration and the slickness grow larger in excess of 6.0 weight parts. The addition of 0.2 to 5.0 weight parts for each 100 weight parts component (A) is preferred.

Component (D) is a catalyst of the crosslinking reaction between component (A) and component (B). Concrete examples of this component are chloroplatinic acid, alcohol-modified chloroplatinic acid, olefin complexes of chloroplatinic acid, chloroplatinic acid/vinylsiloxane complexes, ketone/chloroplatinic acid complexes, solid platinum supported on a carrier such as alumina or silica, platinum black, and palladium and rhodium catalysts. This component need only be added in a catalytic quantity, and generally this component is added in a quantity affording 10 to 1,000 ppm as platinum-type metal proper referred to the total quantity of component (A) plus component (B) plus component (C).

To prepare the composition of the present invention, components (A), (B), (C), and (D) need only be simply mixed and dispersed to homogeneity. The order of addition of the components is not specified. However, when the composition will not be used immediately after mixing, it will be advantageous to store component (D) separately from the mixture of components (A), (B), and (C) and to mix the two immediately prior to use. A cured film is obtained from the composition of the present invention by heating at 50 to 200 degrees Centigrade.

The composition of the present invention may contain other components as desired, for example, organic solvents, addition-reaction retardants, adhesion promoters, dyes, and pigments. Examples of such organic solvents are aromatic hydrocarbons such as benzene, toluene, and xylene; aliphatic hydrocarbons such as heptane, hexane, and pentane; halogenated hydrocarbons such as trichloroethylene and perchloroethylene; ethyl acetate; and methyl ethyl ketone. Examples of the addition-reaction retardants are alkynyl alcohols such as 3-methyl-1-butyne-3-ol, 3,5-dimethyl-1-hexyne-3-ol, 3-methyl-1-pentyne-3-ol, and phenylbutynol, etc., as well as 3-methyl-3-pentene-1-yne, 3,5-dimethyl-3-hexene-1-yne, benzotriazole, and methylvinylsiloxane cyclics.

The release agent composition of the present invention can be applied on various sheet-form substrates such as various types of papers, synthetic resin films and their paper laminates, various fibers and their knits and weaves, and metal foils such as aluminum foil, etc.

The present invention will be explained in the following with reference to illustrative examples. Parts=weight parts in the examples. The content of $C_6$–$C_{18}$ monovalent hydrocarbon group refers to the proportion (mole %) in the total pendant groups on the polysiloxane. The plasticity was measured using a Williams Plastometer based on the provisions of JIS-2123, and the viscosity was measured at 25 degrees Centigrade.

The release force, silicone migration, and slickness were evaluated as follows.

(1) Release Force

The composition was coated in the specified quantity on the surface of the substrate, and a film was formed by curing. This was then coated with Oribine BPS-5127 (acrylic-based tacky agent from Toyo Ink Mfg. Co., Ltd.) or Oribine BPS-2411 (rubber-based tacky agent) and dried for 2 minutes at 70 degrees Centigrade. A facing paper was then adhered, a load of 20 g/cm² was applied, and the assembly was allowed to stand at 25 degrees Centigrade/60% humidity.

Using a Tensilon, the facing paper was peeled at 180 degrees, and the force (g) required for separation was measured. The sample width was always 5 cm.

(2) Silicone Migration

A clean polyester film was placed on the surface of the cured release paper, and this was loaded with 100 kg/cm² using a press (30 minutes, 25 degrees Centigrade).

The release paper was then stripped off, and a line was drawn using Magic Ink (registered trademark) on the surface which had been in contact with the silicone surface. The degree of ink crawling was evaluated.

(3) Slickness

The dynamic coefficient of friction was measured using the two different surfaces of the cured release paper as the friction pair: slipping is easier at lower numerical values of the dynamic coefficient of friction.

EXAMPLE 1

Compositions 1 through 5 were prepared using the following components and the proportions reported in Table 1: dimethylvinylsiloxy-terminated dimethylsiloxanemethylvinylsiloxane copolymer having a viscosity of 1,500 centipoise (siloxane A, vinyl group content=1.2 weight %, dimethylsiloxane :methylvinylsiloxane ratio=29:1), dimethylvinylsiloxy-terminated dimethylpolysiloxane having a viscosity of 5,000 centipoise (siloxane A'), trimethylsiloxy-terminated methylhydrogenpolysiloxane having a viscosity of 10 centipoise (siloxane B), and trimethylsiloxy-terminated dimethylsiloxane-methylphenylsiloxane copolymer having a viscosity of 5,000 centipoise (siloxane C, phenyl group content=6 mole %).

Isopropanol-modified chloroplatinic acid was thoroughly mixed into each of the prepared compositions to give 200 ppm as platinum. Each composition was then coated at approximately 1.0 g/m² on polyethylene-laminated kraft paper, and this was heated for 45 seconds at 150 degrees Centigrade to form a cured film. The cured film obtained from each composition was coated with the tacky agent, Oribine BPS-5127 (Toyo Ink Mfg. Co., Ltd.), followed by heating/drying for 2 minutes at 70 degrees Centigrade. The release force, silicone migration, and slickness were then measured, and these results are reported in Table 2.

TABLE 1

| Siloxane | Present Invention | | Comparison Examples | | |
|---|---|---|---|---|---|
| | Comp. 1 (parts) | Comp. 2 (parts) | Comp. 3 (parts) | Comp. 4 (parts) | Comp. 5 (parts) |
| A | 84* | 81 | 86 | 75 | 46 |
| A' | — | — | — | 20 | 50 |
| B | 4 | 5 | 4 | 5 | 4 |
| C | 2 | 4 | — | — | — |

TABLE 2

| Composition Number | Release Force | | Silicone Migration, Ink Crawling | Slickness, Dynamic Friction Coefficient |
|---|---|---|---|---|
| | 1 day (g) | 30 days (g) | | |
| Composition 1 | 14 | 15 | no | 0.41 |
| Composition 2 | 12 | 12 | no | 0.40 |
| Composition 3 | 46 | 40 | no | 0.41 |
| Composition 4 | 16 | 18 | yes | 0.23 |
| Composition 5 | 14 | 13 | yes | 0.21 |

EXAMPLE 2

100 Parts dimethylvinylsiloxy-terminated dimethylsiloxane-methylvinylsiloxane copolymer having a viscosity of 2,000 centipoise (vinyl group content=0.8 weight %, dimethylsiloxane:methylvinylsiloxane ratio=44.5:1), 7 parts trimethylsiloxy-terminated methylhydrogenpolysiloxane (viscosity=100 centipoise), and trimethylsiloxy-terminated dimethylsiloxanemethylphenylsiloxane copolymer having a viscosity of 1,000 centipoise (siloxane C', phenyl group content=8 mole %, quantity reported in Table 3) were mixed to homogeneity in order to prepare compositions 6 through 9. Isopropanol-modified chloroplatinic acid was thoroughly mixed into each of the obtained compositions to give 150 ppm as platinum, and each composition was then coated at approximately 1.0 g/m² on polyethylene-laminated kraft paper. A cured film was formed by heating for 45 seconds at 150 degrees Centigrade. The cured film from each composition was coated with the tacky agent, Oribine BPS-2411 (Toyo Ink Mfg. Co., Ltd.), followed by heating/drying for 2 minutes at 70 degrees Centigrade. The release force, silicone migration, and slickness were measured on each product, and these results are reported in Table 3.

TABLE 3

| Composition Number | Siloxane C' Addition (parts) | Release Force, | | Silicone Migration, Ink Crawling | Slickness, Dynamic Friction Coefficient |
|---|---|---|---|---|---|
| | | 1 day (g) | 30 days (g) | | |
| Composition 6 | 0.3 | 14 | 14 | no | 0.42 |
| Composition 7 | 5.0 | 13 | 12 | no | 0.41 |
| Composition 8 | 0.05 | 39 | 36 | no | 0.42 |
| Composition 9 | 7.0 | 13 | 13 | yes | 0.29 |

EXAMPLE 3

100 Parts dimethylvinylsiloxy-terminated dimethylsiloxane-methylvinylsiloxane copolymer having a viscosity of 3,000 centipoise (vinyl group content=0.8 weight %, dimethylsiloxane:methylvinylsiloxane ratio=44.5:1), 7 parts trimethylsiloxy-terminated methylhydrogenpolysiloxane (viscosity=30 centipoise), and 2 parts dimethylsiloxane-methylphenylsiloxane copolymer (siloxanes 1 to 7) with the characteristics reported in Table 4 were mixed to homogeneity to give compositions 10 through 16.

TABLE 4

| Siloxane Number | Phenyl Group Content (mole %) | Viscosity (cp) | End-blocking Group |
|---|---|---|---|
| Siloxane 1 | 3 | 600 | trimethylsiloxy |
| Siloxane 2 | 5.5 | 3,000 | hydroxyl |
| Siloxane 3 | 9.5 | 30,000 | trimethylsiloxy |
| Siloxane 4 | 1.5 | 3,000 | hydroxyl |
| Siloxane 5 | 15 | 6,000 | trimethylsiloxy |
| Siloxane 6 | 6 | 50 | trimethylsiloxy |
| Siloxane 7 | 7.5 | 1,000,000 | trimethylsiloxy |

Isopropanol-modified chloroplatinic acid was thoroughly mixed into each of the obtained compositions to give 150 ppm as platinum. Each of these compositions was coated at approximately 1.0 g/m$^2$ on polyethylene-laminated kraft paper, followed by heating at 150 degrees Centigrade for 45 seconds to form the cured films. The cured film obtained from each composition was coated with the tacky agent, Oribine BPS-5127 (Toyo Ink Mfg. Co., Ltd.), and this was heated/dried for 2 minutes at 70 degrees Centigrade. The release force, silicone migration, and slickness were measured on each product, and these results are reported in Table 5.

TABLE 5

| Composition Number | Siloxane Used | Release Force 1 day (g) | Release Force 30 days (g) | Silicone Migration, Ink Crawling | Slickness, Dynamic Friction Coefficient |
|---|---|---|---|---|---|
| 10 | 1 | 14 | 14 | no | 0.42 |
| 11 | 2 | 12 | 12 | no | 0.42 |
| 12 | 3 | 13 | 12 | no | 0.41 |
| 13 | 4 | 43 | 40 | no | 0.41 |
| 14 | 5 | 48 | 47 | no | 0.41 |
| 15 | 6 | 41 | 39 | no | 0.42 |
| 16 | 7 | 40 | 36 | no | 0.41 |

EXAMPLE 4

Compositions 17 through 21 were prepared using the following components and the proportions reported in Table 6: dimethylvinylsiloxy-terminated dimethylsiloxanemethylvinylsiloxane copolymer having a viscosity of 2,000,000 centipoise (siloxane D, vinyl group content = 1.0 weight %, dimethylsiloxane:methylvinylsiloxane ratio = 35:1), dimethylvinylsiloxy-terminated dimethylpolysiloxane gum D', trimethylsiloxy-terminated methylhydrogenpolysiloxane E (viscosity = 5 centipoise), trimethylsiloxy-terminated dimethylsiloxane-methylphenylsiloxane copolymer F (viscosity = 10,000 centipoise, phenyl group content = 5 mole %), and toluene.

TABLE 6

| | Present Invention | | Comparison Examples | | |
|---|---|---|---|---|---|
| Component Used | Comp. 17 (parts) | Comp. 18 (parts) | Comp. 19 (parts) | Comp. 20 (parts) | Comp. 21 (parts) |
| D | 100 | 100 | 100 | 80 | 50 |
| D' | — | — | — | 20 | 50 |
| E | 3 | 4 | 3 | 3 | 4 |
| F | 1 | 3 | — | — | — |
| Toluene | 1896 | 1893 | 1897 | 1897 | 1986 |

Isopropanol-modified chloroplatinic acid was thoroughly mixed into each of the obtained compositions to give 150 ppm as platinum. Each composition was then coated at approximately 0.8 g/m$^2$ on polyethylene-laminated kraft paper, followed by heating at 150 degrees Centigrade for 45 seconds to form the cured films. The cured film from each composition was coated with the tacky agent, Oribine BPS-5127 (Toyo Ink Mfg. Co., Ltd.), followed by heating/drying for 2 minutes at 70 degrees Centigrade.

The release force, silicone migration, and slickness of the products were measured, and are reported in Table 7.

TABLE 7

| Composition Number | Release Force 1 day (g) | Release Force 30 days (g) | Silicone Migration, Ink Crawling | Slickness, Dynamic Friction Coefficient |
|---|---|---|---|---|
| Composition 17 | 15 | 16 | no | 0.42 |
| Composition 18 | 13 | 13 | no | 0.41 |
| Composition 19 | 48 | 41 | no | 0.41 |
| Composition 20 | 16 | 18 | yes | 0.21 |
| Composition 21 | 13 | 13 | yes | 0.20 |

EXAMPLE 5

100 Parts dimethylvinylsiloxy-terminated dimethylsiloxane-methylvinylsiloxane copolymer gum (dimethylsiloxane:methylvinylsiloxane ratio = 29:1, vinyl group content = 1.2 weight %, plasticity = 1.56), 4 parts trimethylsiloxy-terminated methylhydrogenpolysiloxane (viscosity = 15 centipoise), 2 parts dimethylsiloxanemethylphenylsiloxane copolymer with the characteristics reported in Table 8 (siloxanes 8 to 13), and 1893 parts toluene were mixed to homogeneity to prepare compositions 22 through 27.

TABLE 8

| Siloxane Number | Phenyl Group Content (mole %) | Viscosity (cp) | End-blocking Group |
|---|---|---|---|
| Siloxane 8 | 3.5 | 7,000 | trimethylsiloxy |
| Siloxane 9 | 6 | 50,000 | hydroxyl |
| Siloxane 10 | 9 | 300,000 | trimethylsiloxy |
| Siloxane 11 | 1.5 | 50,000 | hydroxyl |
| Siloxane 12 | 15 | 7,000 | trimethylsiloxy |
| Siloxane 13 | 6 | 50 | trimethylsiloxy |

Isopropanol-modified chloroplatinic acid was thoroughly mixed into each of the prepared compositions to give 150 ppm as platinum. Each composition was then coated at approximately 0.8 g/m$^2$ on polyethylene-laminated kraft paper, followed by heating for 45 seconds at 150 degrees Centigrade to form the cured film. The cured film obtained from each composition was coated with the tacky agent, Oribine BPS-2411 (Toyo Ink Mfg. Co., Ltd.), and this was heated/dried for 2 minutes at 70 degrees Centigrade. The release force, silicone migration, and slickness were measured on these products, and these results are reported in Table 9.

TABLE 9

| Composition Number | Siloxane Used | Release Force 1 day (g) | Release Force 30 days (g) | Silicone Migration, Ink Crawling | Slickness, Dynamic Friction Coefficient |
|---|---|---|---|---|---|
| 22 | 8 | 15 | 16 | no | 0.41 |
| 23 | 9 | 12 | 12 | no | 0.41 |
| 24 | 10 | 14 | 15 | no | 0.41 |
| 25 | 11 | 43 | 40 | no | 0.42 |
| 26 | 12 | 49 | 47 | no | 0.40 |
| 27 | 13 | 38 | 35 | no | 0.40 |

EXAMPLE 6

Compositions 28 to 31 were prepared by mixing the following to homogeneity: 100 parts dimethylvinylsiloxy-terminated dimethylsiloxane-methylvinylsiloxane copolymer gum (dimethylsiloxane:methylvinylsiloxane ratio=44.5:1, vinyl group content=0.8 weight %, plasticity=1.48), 6 parts trimethylsiloxy-terminated methylhydrogenpolysiloxane (viscosity=200 centipoise), dimethylsiloxane-methylphenylsiloxane copolymer (siloxane G, viscosity=30,000 centipoise, phenyl group content=7.5 mole %, quantity reported in Table 10), and 1,890 parts toluene.

Isopropanol-modified chloroplatinic acid was thoroughly mixed into each of the prepared compositions to give 150 as platinum. These compositions were respectively coated on polyethylene-laminated kraft paper at approximately 0.8 g/m$^2$, and cured films were formed by heating for 45 seconds at 150 degrees Centigrade. The cured film obtained from each composition was then coated with the tacky agent, Oribine BPS-5127 (Toyo Ink Mfg. Co., Ltd.), followed by heating/drying for 2 minutes at 70 degrees Centigrade. The release force, silicone migration, and slickness of these products were measured, and the results are reported in Table 10.

TABLE 10

| Composition Number | Siloxane G Used (parts) | Release Force 1 day (g) | Release Force 30 days (g) | Silicone Migration, Ink Crawling | Slickness, Dynamic Friction Coefficient |
|---|---|---|---|---|---|
| 28 | 0.3 | 16 | 16 | no | 0.40 |
| 29 | 5.0 | 13 | 13 | no | 0.41 |
| 30 | 0.05 | 37 | 32 | no | 0.41 |
| 31 | 8.0 | 12 | 13 | yes | 0.30 |

EXAMPLE 7

Compositions 32 through 35 were prepared by mixing the following to homogeneity: 100 parts dimethylvinylsiloxy-terminated dimethylsiloxane-methylvinylsiloxane copolymer gum (dimethylsiloxane:methylvinylsiloxane ratio=25:1, vinyl group content=1.4 weight %, plasticity=1.52), 4 parts trimethylsiloxy-terminated methylhydrogenpolysiloxane having a viscosity of 35 centipoise, 3 parts trimethylsiloxy-terminated dimethylsiloxane-diphenylsiloxane copolymer having a viscosity of 10,000 centipoise (siloxanes 14 to 17) with the characteristics reported in Table 11, and 1,893 parts toluene.

Isopropanol-modified chloroplatinic acid was thoroughly mixed into each of the prepared compositions to give 150 ppm as platinum. Each of these compositions was then coated at approximately 0.8 g/m$^2$ on polyethylene-laminated kraft paper, and the cured film was formed by heating for 45 seconds at 150 degrees Centigrade. The cured film obtained from each composition was coated with the tacky agent, Oribine BPS-5127 (from Toyo Ink Mfg. Co., Ltd.), followed by heating/drying for 2 minutes at 70 degrees Centigrade. The release force, silicone migration, and slickness were measured on each of the products, and these results are also reported in Table 11.

TABLE 11

| Composition Number | Phenyl Group Content (mole %) | Release Force 1 day (g) | Release Force 30 days (g) | Silicone Migration, Ink Crawling | Slickness, Dynamic Friction Coefficient |
|---|---|---|---|---|---|
| 32 | 5, #14 | 12 | 12 | no | 0.42 |
| 33 | 8, #15 | 13 | 12 | no | 0.41 |
| 34 | 0.5, #16 | 42 | 39 | no | 0.42 |
| 35 | 20, #17 | 39 | 37 | no | 0.40 |

EXAMPLE 8

Compositions 36 through 40 were prepared by mixing the following components to homogeneity in the proportions given in Table 12: dimethylvinylsiloxy-terminated dimethylsiloxane-methylvinylsiloxane copolymer gum (siloxane H, dimethylsiloxane:methylvinylsiloxane ratio=35:1, vinyl group content=1.0 weight %, plasticity=1.54), dimethylvinylsiloxy-terminated dimethylpolysiloxane gum (siloxane H', plasticity=1.54), trimethylsiloxy-terminated methylhydrogenpolysiloxane having a viscosity of 5 centipoise (siloxane I), trimethylsiloxy-terminated dimethylsiloxanemethyldecylsiloxane copolymer having a viscosity of 10,000 centipoise (siloxane J, decyl group content=10 mole %), and toluene.

TABLE 12

| | Present Invention | | Comparison Examples | | |
|---|---|---|---|---|---|
| Component Used | Comp. 36 (parts) | Comp. 37 (parts) | Comp. 38 (parts) | Comp. 39 (parts) | Comp. 40 (parts) |
| H | 100 | 100 | 100 | 80 | 50 |
| H' | — | — | — | 20 | 50 |
| I | 4 | 4 | 4 | 4 | 4 |
| J | 1 | 3 | — | — | — |
| Toluene | 1895 | 1893 | 1896 | 1896 | 1896 |

Isopropanol-modified chloroplatinic acid was thoroughly mixed into each of the obtained compositions to give 150 ppm as platinum. Each composition was then coated on polyethylene-laminated kraft paper at approximately 0.8 g/m$^2$ and the cured film was formed by heating for 45 seconds at 150 degrees Centigrade. The cured film from each composition was coated with the tacky agent, Oribine BPS-5127 (Toyo Ink Mfg. Co., Ltd.), followed by heating/drying for 2 minutes at 70 degrees Centigrade. The release force, silicone migration, and slickness were measured on the products, and these results are reported in Table 13.

TABLE 13

| Composition Number | Release Force 1 day (g) | Release Force 30 days (g) | Silicone Migration, Ink Crawling | Slickness, Dynamic Friction Coefficient |
|---|---|---|---|---|
| Composition 36 | 14 | 15 | no | 0.43 |
| Composition 37 | 13 | 13 | no | 0.41 |
| Composition 38 | 48 | 42 | no | 0.43 |
| Composition 39 | 16 | 17 | yes | 0.21 |
| Composition 40 | 13 | 13 | yes | 0.20 |

EXAMPLE 9

Compositions 41 through 47 were prepared by mixing the following components to homogeneity: 100 parts dimethylvinylsiloxy-terminated dimethylsiloxane-methylvinylsiloxane copolymer having a viscosity of 500 centipoise (dimethylsiloxane:methylvinylsiloxane ratio=17:1, vinyl group content=2.0 weight %), 5 parts trimethylsiloxy-terminated methylhydrogenpolysiloxane having a viscosity of 15 centipoise, and dimethylsiloxane-methylorganosiloxane copolymer (siloxanes 18 through 24) with the characteristics reported in Table 14.

TABLE 14

| Siloxane Number | Organic Group ($C_6$-$C_{18}$) | Organic Group ($C_6$-$C_{18}$) Content (mole %) | Viscosity (cp) | End-blocking Group |
|---|---|---|---|---|
| Siloxane 18 | —$(CH_2)_9CH_3$ | 4.0 | 10,000 | hydroxyl |
| Siloxane 19 | —$(CH_2)_{13}CH_3$ | 10.0 | 3,000 | trimethylsiloxy |
| Siloxane 20 | —$(Ch_2)_2C_6H_5$ | 7.0 | 200 | trimethylsiloxy |
| Siloxane 21 | —$(CH_2)_9CH_3$ | 7.0 | 20 | hydroxyl |
| Siloxane 22 | —$(CH_2)_9CH_3$ | 7.0 | 1,000,000 | hydroxyl |
| Siloxane 23 | —$(CH_2)_9CH_3$ | 0.5 | 10,000 | trimethylsiloxy |
| Siloxane 24 | —$(CH_2)_3CH_3$ | 6.0 | 10,000 | trimethylsiloxy |

$C_6H_5$ = Phenyl

Isopropanol-modified chloroplatinic acid was thoroughly mixed into each of the prepared compositions to give 150 ppm as platinum. Each of these compositions was then coated at approximately 0.8 g/m² on polyethylene-laminated kraft paper, and the cured films were obtained by heating for 45 seconds at 150 degrees Centigrade. The cured film from each composition was coated with the tacky agent, Oribine BPS-5127 (Toyo Ink Mfg. Co., Ltd.), followed by heating/drying for 2 minutes at 70 degrees Centigrade. The release force, silicone migration, and slickness were measured on each of these products, and these results are reported in Table 15.

TABLE 15

| Composition Number | Siloxane Used | Release Force 1 day (g) | Release Force 30 days (g) | Silicone Migration, Ink Crawling | Slickness, Dynamic Friction Coefficient |
|---|---|---|---|---|---|
| 41 | 18 | 13 | 14 | no | 0.42 |
| 42 | 19 | 12 | 12 | no | 0.41 |
| 43 | 20 | 14 | 14 | no | 0.41 |
| 44 | 21 | 45 | 41 | no | 0.40 |
| 45 | 22 | 42 | 40 | no | 0.41 |
| 46 | 23 | 47 | 40 | no | 0.42 |
| 47 | 24 | 40 | 42 | no | 0.42 |

EXAMPLE 10

Compositions 48 through 51 were prepared by mixing the following components to homogeneity: 100 parts dimethylvinylsiloxy-terminated dimethylsiloxanemethylvinylsiloxane copolymer gum (dimethylsiloxane:methylvinylsiloxane ratio=29:1, vinyl group content=1.2 weight %, plasticity=1.56), 6 parts trimethylsiloxyterminated methylhydrogenpolysiloxane having a viscosity of centipoise, dimethylsiloxane-methyldodecylsiloxane copolymer having a viscosity of 50,000 centipoise and a dodecyl group content of 7.5 mole % (siloxane K, quantity of addition as reported in Table 16).

Isopropanol-modified chloroplatinic acid was thoroughly mixed into each of the prepared compositions to give 150 ppm as platinum. These compositions were respectively coated at approximately 0.8 g/m² on polyethylene-laminated kraft paper, and the cured films were obtained by heating for 45 seconds at 150 degrees Centigrade. The cured films from each composition were coated with the tacky agent, Oribine BPS(from Toyo Ink Mfg. Co., Ltd.), followed by heating/drying for 2 minutes at 70 degrees Centigrade. The release force, silicone migration, and slickness were measured on each product, and these results are also reported in Table 16.

TABLE 16

| Composition Number | Siloxane K Addition (parts) | Release Force 1 day (g) | Release Force 30 days (g) | Silicone Migration, Ink Crawling | Slickness, Dynamic Friction Coefficient |
|---|---|---|---|---|---|
| 48 | 0.3 | 15 | 15 | no | 0.40 |
| 49 | 5.0 | 12 | 12 | no | 0.41 |
| 50 | 0.05 | 41 | 38 | no | 0.41 |
| 51 | 8.0 | 12 | 11 | yes | 0.29 |

EFFECTS OF THE INVENTION

Because the release agent composition of the present invention is based on (A) 100 weight parts methylalkenylpolysiloxane having at least 2 alkenyl groups in each molecule and having a viscosity of at least 40 centipoise at 25 degrees Centigrade, (B) 0.5 to 20 weight parts alkylhydrogenpolysiloxane having at least 3 silicon-bonded hydrogen atoms in each molecule and having a viscosity of 1 to 1,000 centipoise at 25 degrees Centigrade, (C) 0.1 to 6.0 weight parts organopolysiloxane having the following general formula and a viscosity of 100 to 500,000 centipoise at 25 degrees Centigrade (in the above formula, R is the methyl group or a monovalent hydrocarbon group which lacks aliphatically unsaturated bonds and which contains 6 to 18 carbon atoms, with the proviso that said monovalent hydrocarbon group which lacks aliphatically unsaturated bonds and which contains 6 to 18 carbon atoms comprises 2 to 20 mole % of the total groups R in the molecule; R1 is a monovalent hydrocarbon group which lacks aliphatically unsaturated bonds and which contains 1 to 18 carbon atoms, or is the hydroxyl group or an alkoxy group; and n is a positive integer with a value which provides a viscosity of 100 to 500,000 centipoise at 25 degrees Centigrade), and (D) a catalytic quantity of a platinum-type catalyst, it characteristically affords a light-releasing release film which nevertheless presents almost no silicone migration and a very low slickness.

That which is claimed is:

1. Release agent composition comprising
  (A) 100 weight parts methylalkenylpolysiloxane having at least 2 alkenyl groups in each molecule and having a viscosity of at least 40 centipoise at 25 degrees Centigrade,
  (B) 0.5 to 20 weight parts alkylhydrogenpolysiloxane having at least 3 silicon-bonded hydrogen atoms in each molecule and having a viscosity of 1 to 1,000 centipoise at 25 degrees Centigrade,
  (C) 0.1 to 6.0 weight parts organopolysiloxane having the formula $R^1(R_2SiO)_nSiR_2R^1$ and a viscosity of 100 to 500,000 centipoise at 25 degrees Centigrade wherein R is the methyl group or a monovalent hydrocarbon group which lacks aliphatically unsaturated bonds and which contains 6 to 18 carbon atoms, with the proviso that said monovalent hydrocarbon group which lacks aliphatically unsaturated bonds and which contains 6 to 18 carbon atoms comprises 2 to 20 mole % of the total groups R in the molecule; $R^1$ is selected from the group consisting of a monovalent hydrocarbon group which lacks aliphatically unsaturated bonds and which contains 1 to 18 carbon atoms, the hydroxyl group and an alkoxy group; and n is a positive integer with a value which provides a viscosity of 100 to 500,000 centipoise at 25 degrees Centigrade, and (D) a catalytic quantity of a platinum, palladium or rhodium catalyst.

2. A composition according to claim 1 wherein the alkenyl groups of Component (A) are vinyl groups, the alkyl groups of Component (B) are methyl groups and the $R^1$ groups of Component (C) are selected from the group consisting of the hydroxyl group and a monovalent hydrocarbon group which lacks aliphatically unsaturated bonds and which contains 1 to 18 carbon atoms.

3. A composition according to claim 1 wherein the R groups of Component (C) which are aryl or aralkyl comprise from 2-12 mole percent of the total number of R groups in Component (C).

4. A substantially solventless composition according to claim 1 wherein the viscosity of Component (A) has a value of from 40 to 10,000 centipoise at 25 degrees Centigrade and the viscosity of Component (C) has a value of from 100 to 50,000 centipoise at 25 degrees Centigrade.

5. A solvent-containing composition according to claim 1 wherein the viscosity of Component (A) has a value of at least 100,000 centipoise at 25 degrees Centigrade and the viscosity of Component (C) has a value of from 5,000 to 500,000 centipoise at 25 degrees Centigrade.

6. A composition according to claim 1 wherein Component (A) is selected from the group consisting of dimethylvinylsiloxy-terminated dimethylpolysiloxanes, trimethylsiloxy-terminated methylvinylsiloxanedimethylsiloxane copolymers, and hydroxyl-terminated methylvinylsiloxane-dimethylsiloxane copolymers, Component (B) is selected from the group consisting of trimethylsiloxy-terminated dimethylsiloxane-methylhydrogensiloxane copolymers, dimethylhydrogensiloxy-terminated dimethylsiloxane-methylhydrogensiloxane copolymers, trimethylsiloxy-terminated methylhydrogenpolysiloxanes, methylhydrogenpolysiloxane cyclics, and methylhydrogensiloxane-dimethylsiloxane copolyemer cyclics and Component (D) is selected from the group consisting of chloroplatinic acid, alcohol-modified chloroplatinic acid, olefin complexes of chloroplatinic acid, chloroplatinic acid/vinylsiloxane complexes, ketone/chloroplatinic acid complexes, solid platinum supported on a carrier, platinum black, and palladium and rhodium catalysts.

* * * * *